US009507380B2

(12) United States Patent
McKittrick

(10) Patent No.: US 9,507,380 B2
(45) Date of Patent: Nov. 29, 2016

(54) ASSEMBLY FOR ATTACHING A LENS TO A HOUSING

(71) Applicant: GOOGLE TECHNOLOGY HOLDINGS LLC, Mountain View, CA (US)

(72) Inventor: Allen B. McKittrick, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 163 days.

(21) Appl. No.: 14/322,263

(22) Filed: Jul. 2, 2014

(65) Prior Publication Data

US 2016/0006845 A1    Jan. 7, 2016

(51) Int. Cl.
*G06F 1/16*    (2006.01)
*H04M 1/02*    (2006.01)

(52) U.S. Cl.
CPC .......... *G06F 1/1656* (2013.01); *H04M 1/0266* (2013.01)

(58) Field of Classification Search
CPC ................................ G06F 1/1601; G06F 1/1637
USPC ............. 361/679.3, 679.56, 752; 349/56–60; 455/575.1–575.9
See application file for complete search history.

(56) References Cited

U.S. PATENT DOCUMENTS

| | | | |
|---|---|---|---|
| 2,747,166 A | 5/1956 | Hoffarth | |
| 5,107,404 A | 4/1992 | Tam | |
| 5,519,169 A | 5/1996 | Garrett et al. | |
| 5,620,290 A | 4/1997 | Homfeldt et al. | |
| 6,019,614 A | 2/2000 | Baur et al. | |
| 6,560,119 B1 | 5/2003 | Katsuyama et al. | |
| 7,349,222 B2 | 3/2008 | Kim | |
| 7,456,793 B2 | 11/2008 | Napoles et al. | |
| 7,491,070 B2 | 2/2009 | Chen et al. | |
| 7,558,054 B1* | 7/2009 | Prest ................... | H05K 5/0239 361/679.3 |
| 7,633,747 B2* | 12/2009 | Yang .................... | G06F 1/1626 345/173 |
| 7,688,574 B2* | 3/2010 | Zadesky ............. | H04M 1/0252 361/679.21 |
| 8,000,111 B2 | 8/2011 | Liao | |
| 8,199,528 B2 | 6/2012 | Tachikawa et al. | |
| 8,238,087 B2* | 8/2012 | McClure ............... | G06F 1/1613 248/178.1 |
| 8,250,724 B2* | 8/2012 | Dabov ................. | G06F 1/1626 29/407.05 |
| 8,315,062 B2 | 11/2012 | Liu | |
| 8,540,919 B2 | 9/2013 | Lin | |
| 8,611,077 B2* | 12/2013 | Sanford ............... | G06F 1/1626 361/679.21 |
| 8,634,206 B2 | 1/2014 | Lin et al. | |
| 8,797,721 B2* | 8/2014 | Pakula ................. | G06F 1/1626 361/679.01 |

(Continued)

OTHER PUBLICATIONS

"Restriction Requirement", U.S. Appl. No. 14/283,620, Oct. 8, 2015, 6 pages.

(Continued)

*Primary Examiner* — Anthony Haughton
(74) *Attorney, Agent, or Firm* — Wolfe-SBMC

(57) ABSTRACT

The present invention provides an assembly for attaching a lens to a housing of a device. The assembly includes a housing having a front opening, and a front edge which extends at least partially around the front opening, and a circuit substrate coupled to the housing. The assembly further includes one or more end caps coupled to the circuit substrate, the one or more end caps each having a front facing surface, where each end cap extends at least partially into the space between the circuit substrate and the front edge of the housing. A lens is coupled to the housing at the front edge and the front facing surface of the end cap.

20 Claims, 3 Drawing Sheets

(56) References Cited

U.S. PATENT DOCUMENTS

| | | |
|---|---|---|
| 2005/0079748 A1 | 4/2005 | Kim |
| 2006/0089023 A1 | 4/2006 | Kim |
| 2006/0202912 A1 | 9/2006 | Shin |
| 2010/0203929 A1 | 8/2010 | Skagmo et al. |
| 2012/0168578 A1 | 7/2012 | Peng et al. |
| 2013/0343015 A1 | 12/2013 | Malek et al. |
| 2016/0007495 A1 | 1/2016 | McKittrick |

OTHER PUBLICATIONS

"Non-Final Office Action", U.S. Appl. No. 14/283,620, Apr. 8, 2016, 7 pages.

"Non-Final Office Action", U.S. Appl. No. 14/322,295, May 26, 2016, 8 pages.

"Final Office Action", U.S. Appl. No. 14/322,295, Oct. 14, 2016, 13 pages.

"Final Office Action", U.S. Appl. No. 14/283,620, Sep. 23, 2016, 8 pages.

* cited by examiner

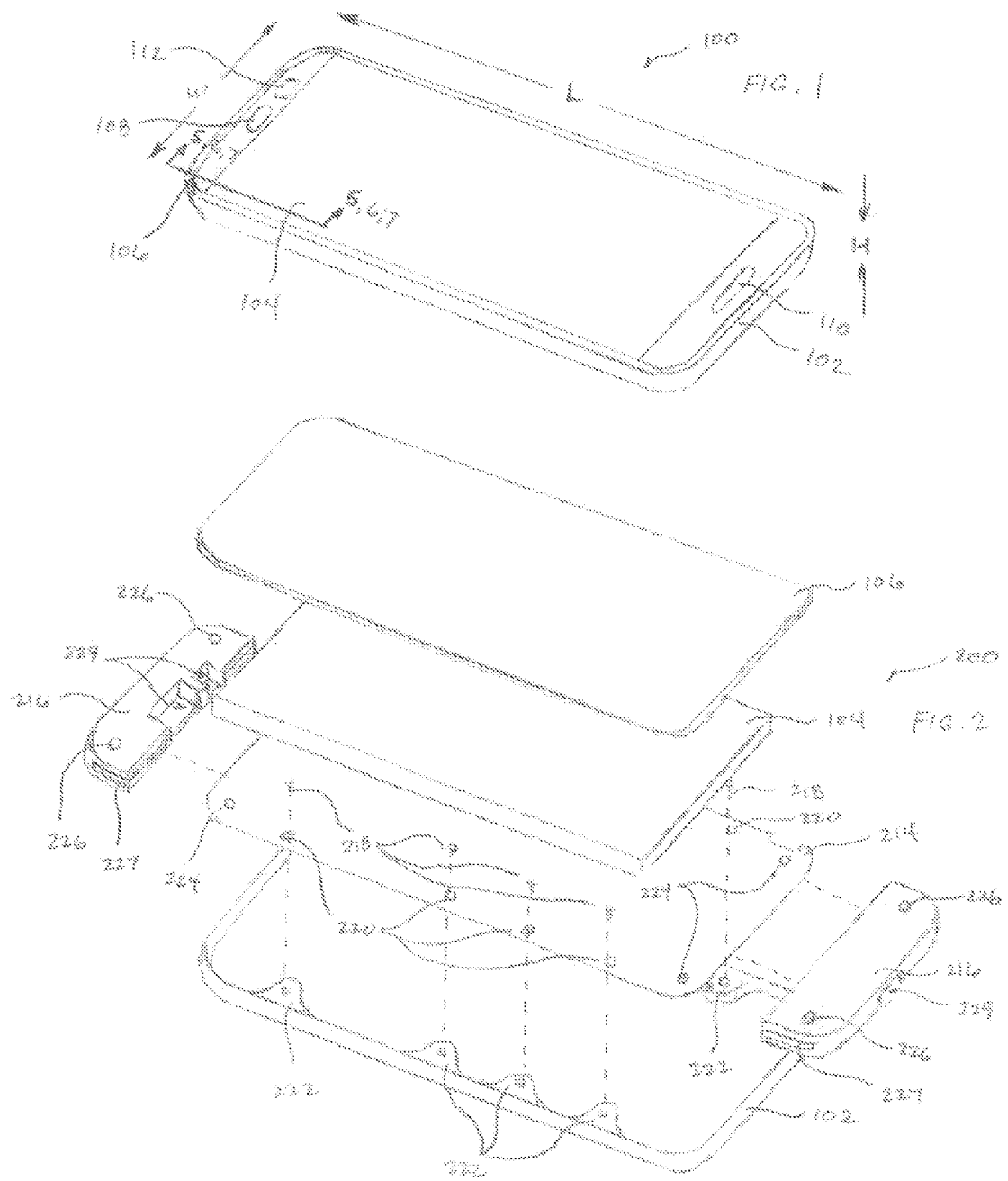

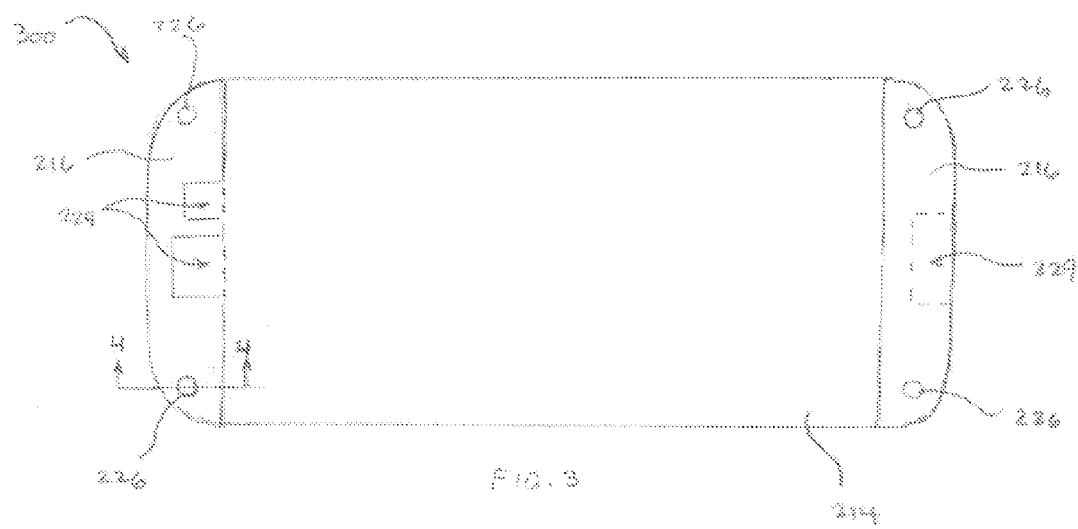
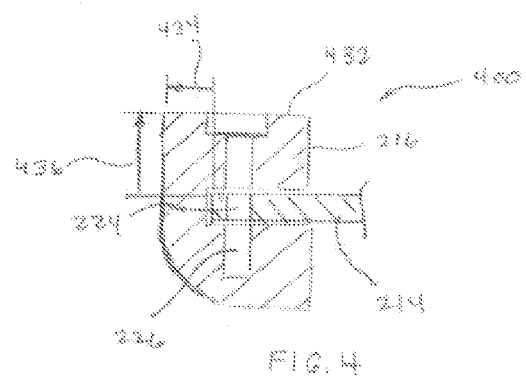
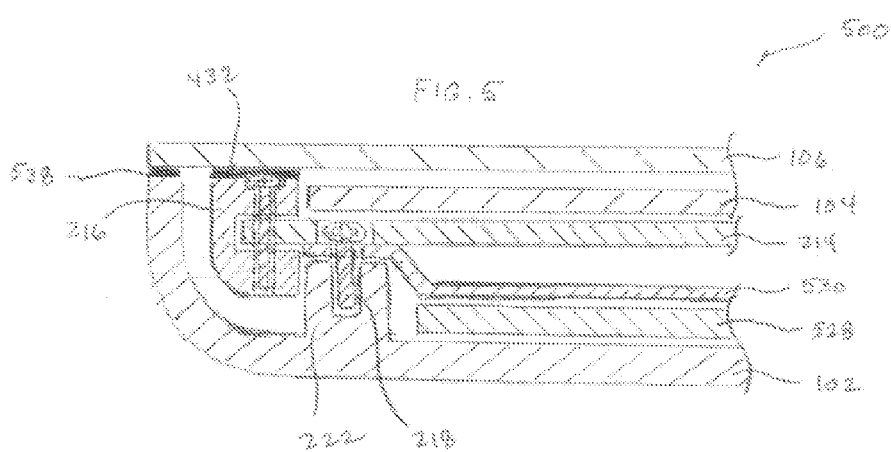

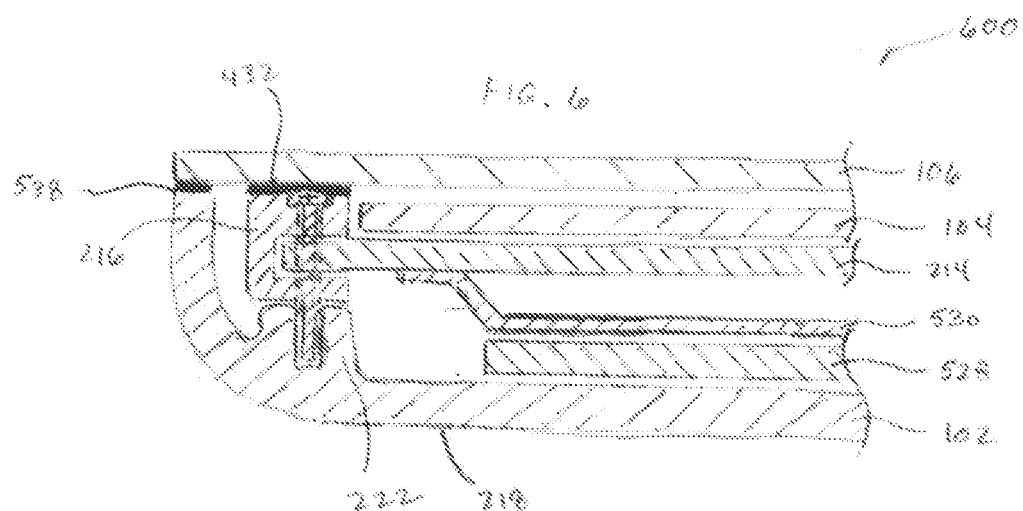
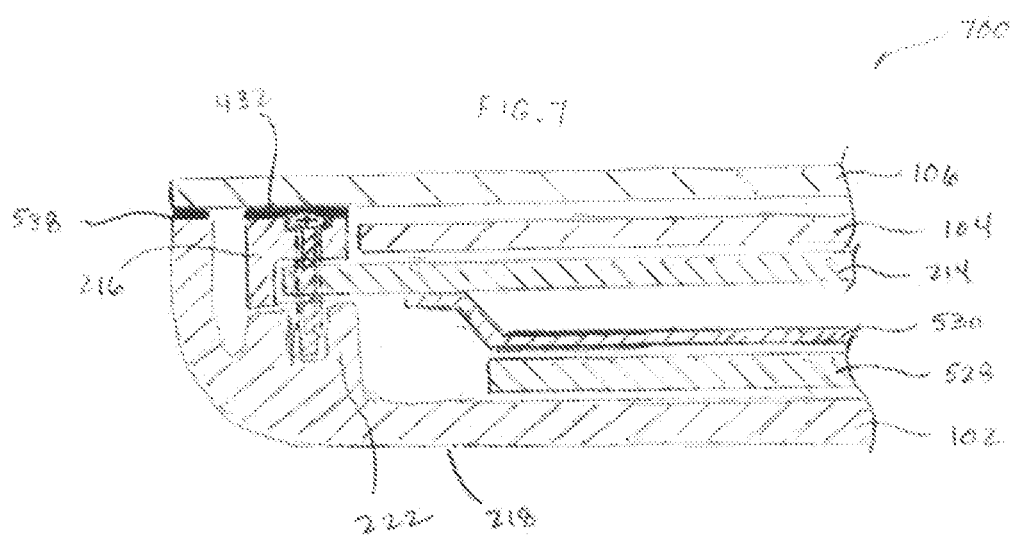

ASSEMBLY FOR ATTACHING A LENS TO A HOUSING

FIELD OF THE INVENTION

The present invention relates generally to an assembly for attaching a lens to a housing, and more particularly, to the attachment of lens to one or more end caps of a circuit substrate in addition to the housing.

BACKGROUND OF THE INVENTION

There is an increasing trend with regard to personal cellular communications toward the use of smartphone devices, which in addition to allowing for voice communications, also enable more extensive data type services including text messaging and web browsing. In support of such services, there has been a corresponding desire to enlarge the screen sizes in order to support the viewing of web pages, as well as support more sophisticated graphical interfaces.

As a result of increasing screen size, device real estate previously available for keyboard interfaces often involving one or more mechanically actuated buttons have given way to virtual keys integrated into the graphical interface with the virtual buttons displayed on respective portions of the ever larger screen sizes, and a touch sensitive interface overlaid upon the display screens to detect the particular area and/or button with which the user is wanting to interact.

In order to maximize the size of the screen relative to the size of the front facing of the device, many devices have elected to reduce the border region outside the area of the display. As a result, devices with housings having reduced border regions can often result in a reduced amount of front side surface space or area associated with the housing to which a front lens can be affixed.

In at least some instances, the size and shape of the front surface opening in the housing may be further affected, when during manufacturer, the front surface opening provides the access by which at least some of the internally positioned components are placed within the housing. In some of these instances, the front opening in the housing may provide the only access for internally positioned components, which in turn could additionally impact the available surface area of the housing to which the front lens can be bonded.

However a secure manner of attaching the lens can be important, as a housing of a hand held device can sometimes be subjected to external stresses, such as a user inadvertently sitting on the device, or the user accidently dropping the device. If the lens is not sufficiently attached to the housing, the lens can become at least partially delaminated dependent upon the nature and the amount of the force experienced by the device, housing and/or lens under various conditions. Even though the conditions that might cause delamination might not be consistent with normal usage conditions, in some instances the phone might be the subject of handling that goes beyond normal usage. It would be beneficial for the device to be able to survive at least some levels of unforeseen handling within reason. While one may not be able to secure the device against any and all levels of potentially applied external forces, it would be increasingly beneficial to the user to the extent that the survivable levels of external forces could be increased.

Correspondingly, the present inventor has recognized that it would be beneficial to manage the structure and corresponding method of attaching the lens to the housing, where the space requirements might limit the available area for attaching directly to the housing. In turn, the applicant has recognized that providing an area of attachment that extends beyond the housing would be beneficial.

SUMMARY OF THE INVENTION

The present invention provides an assembly for attaching a lens to a housing of a device. The assembly includes a housing having a front opening, and a front edge which extends at least partially around the front opening, and a circuit substrate coupled to the housing. The assembly further includes one or more end caps coupled to the circuit substrate, the one or more end caps each having a front facing surface, where each end cap extends at least partially into the space between the circuit substrate and the front edge of the housing. A lens is coupled to the housing at the front edge and the front facing surface of the end cap.

In at least one embodiment, the end caps overlap the circuit substrate, where the circuit substrate has a front surface and a back surface opposite the front surface, and the front surface faces toward the front of the device, and where the end caps overlap at least partially the front surface of the circuit substrate.

In at least a further embodiment, the front facing surface of the end cap is substantially in line with the front edge of the housing which extends at least partially around the front opening.

The present invention further provides a hand-held electronic device. The electronic device includes a housing having a front opening, and a front edge which extends at least partially around the front opening, and a circuit substrate coupled to the housing. The assembly further includes one or more end caps coupled to the circuit substrate, the one or more end caps each having a front facing surface, where each end cap extends at least partially into the space between the circuit substrate and the front edge of the housing. A lens is coupled to the housing at the front edge and the front facing surface of the end cap.

These and other objects, features, and advantages of this invention are evident from the following description of one or more preferred embodiments of this invention, with reference to the accompanying drawings.

BRIEF DESCRIPTION OF THE DRAWINGS

FIG. 1 is a perspective view of an exemplary electronic device, such as a hand held device;

FIG. 2 is a partial front side exploded perspective view of the hand held device, illustrated in FIG. 1;

FIG. 3 is a front side plan view of a circuit substrate with a pair of end caps coupled thereto;

FIG. 4 is a partial cross-sectional side view of the circuit substrate and end cap;

FIG. 5 is a partial side cross-sectional view of a device including an assembly for attaching the lens to the housing;

FIG. 6 is a partial side cross-sectional view of a device including an assembly for attaching the lens to the housing, in accordance with at least one alternative embodiment; and FIG. 7 is a partial side cross-sectional view of a device including an assembly for attaching the lens to the housing, in accordance with a still further alternative embodiment.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a perspective view of an exemplary electronic device, such as a hand held device 100, which is suitable for use with an assembly for attaching a lens to a housing, which seeks to increase the area available for attaching the lens to the device including the housing and other structure. The device is illustrated from the front side perspective.

In the illustrated embodiment, the hand held device includes a housing 102, which contains a display 104 behind a top lens 106, where the top lens 106 has openings for a speaker 108, a microphone 110, and a front facing camera 112. In at least some embodiments, the housing will include a backside surface and integrated sidewalls which extend at least partially around the perimeter of the device in a bucket type configuration. Such a configuration helps reduce the number of seams that are formed when alternatively bringing together multiple originally separate housing pieces, that can allow additional areas through which dust or moisture might impede on the internals of the device.

In the exemplary embodiment the display 104 is intended to incorporate a touch sensitive interface for use by the user in interacting with one or more displayed elements. The illustrated device, while suitable for use as a cellular radio frequency smartphone, could also be suitable for other types of electronic devices including other types of wireless communication devices, media (i.e., music, video) players, personal digital assistants, portable video gaming devices, cameras, and/or remote controls. The electronic device may also be a user input subassembly of some other equipment, like an appliance or other machine.

The speaker 108 and microphone 110 are arranged to be proximate the user's ear and the user's mouth, respectively, when the device is brought into proximity to the user's face in support of voice communications. The front facing camera can be used to image the user while interacting with the touch screen interface of the device, and could be used to support a video chat type feature. Presumably, the image of the other party with which the user is communicating could be presented via the display 104. The device 100 could further include a rear facing camera (not shown), which would enable the user to capture images in the direction that the user is facing, when interacting with the touch screen interface.

The device could further incorporate a proximity sensor, not shown, for use in detecting the presence of the device proximate a surface, such as the surface of a user's face. Alternatively, the front facing camera 112 or the display 104 incorporating touch sensitive features might be used to detect the proximity of another object. While not shown, the device could support other forms of porting, such as ports for a wired connection, such as for audio (i.e. head phone jack), communications and/or charging (i.e. universal serial bus port). The device could further include ports for receiving one or more forms of auxiliary storage and/or smartcards, such as a secure digital (SD) memory card or one or more subscriber identity modules (SIM).

Enhanced data services, such as web browsing, associated with smartphones, as well as enhanced graphical user interfaces, including touch sensitive interfaces, make beneficial the use of larger higher resolution displays. As such, many similar type devices have followed the trend toward relatively larger dimension in the length (L) and width (W) direction, but in an attempt to minimize the overall size, several manufacturers have attempted to minimize the height (H), which is sometimes referred to as the device thickness.

FIG. 2 illustrates a partial front side exploded perspective view 200 of the hand held device 100, illustrated in FIG. 1. In addition to the housing 102, the display 104, and the lens 106, the exploded view further illustrates a circuit substrate 214, such as a printed circuit board (PCB); one or more end caps 216 intended to be coupled to the circuit substrate 214; and one or more fasteners 218, such as one or more screws. In the illustrated embodiment, there are a pair of end caps 216. The end caps 216 are mounted to opposite ends of the circuit substrate 214. The circuit substrate includes one or more through holes 220, through which a fastener 218 can be received for attaching the circuit substrate to the housing 102. Generally, the through holes 220 are drilled all the way through the circuit substrate 214. The fasteners are adapted to extend through the through hole 220 and into one or more respective bosses 222 coupled to and/or formed into the housing 102. The bosses 222 generally have a ledge upon which the received structure such as the circuit substrate 214 can rest, as well as a hole, which extends partially into the housing 102, for receiving the end of the fastener 218 extending through the through hole 220 of the circuit substrate 214.

The circuit substrate includes additional through holes 224, which are located so as to align with corresponding holes 226 in the one or more end caps 216, when the end caps have been received the circuit substrate 214. In the illustrated embodiment, the end cap includes a slot 227 within which an end of the circuit substrate 214 can be received, wherein upon receipt of the circuit substrate 214 within the slot 227 of the end cap 216, the through holes 224 of the circuit substrate will align with respective holes 226 of the end cap 216. Further screws (see FIG. 5) can then be used to couple and/or affix the end cap 216 to the circuit substrate 214. In the illustrated embodiment, the slots 227 are sized to be slightly wider than the thickness of the circuit substrate 214.

The end cap 216 can include one or more void areas 229, which allow for the end cap to avoid other components and/or subassemblies that might be present on the surface of the circuit substrate 214 proximate the corresponding end of the circuit substrate 214 which is received by the end cap 216. In the illustrated embodiment, one of the void areas 229 is intended to avoid a speaker 108, while the other one of the void areas 229 is intended to avoid a front facing camera 112. Other void areas 229 can be used to avoid the same or other types of structures that might be present on the circuit substrate 214 proximate to where the same or other end caps 216 are intended to be coupled to the circuit substrate 214. Additional examples of other components and/or subassemblies that might be present on the surface of the circuit substrate 214 proximate the corresponding end of the circuit substrate 214 which is received by the end cap 216 include charging ports, data communication ports, head phone jack ports, as well as ports for receiving one or more forms of auxiliary storage. However, to the extent that these types of components or subassemblies may be present, they need not be positioned proximate to where an end cap 216 is intended to be received, in which case, there need not be any corresponding void area 229.

In some instances, still further additional elements, while not shown in the exploded view, may additionally be present. For example, in at least one embodiment of the present invention, a battery 528 and/or a mounted structure 530, such as a shield, (see FIG. 5) can be located between the circuit substrate 214 and the housing 102. A mounted structure 530, such as a shield, can often includes a grounded conductive metal structure that can be used to shield the underlying circuitry, electromagnetically, as well as help to physically protect any underlying circuitry.

FIG. 3 illustrates a front side plan view 300 of a circuit substrate 214 with a pair of end caps 216 coupled thereto. As previously noted, the end caps include holes 226, which are intended to coincide with corresponding through holes 224 (see FIG. 2) of the circuit substrate 214, when the circuit substrate 214 is received by the end cap 216. The end caps 216 may additionally include one or more void areas 229. In some instances, the end cap 216 might provide additional structural support and/or rigidity to the circuit substrate 214, which could be used to avoid the need for additional structure, such as stiffeners or a subframe. The end cap 216 can additionally provide a raised surface 432 (see FIGS. 4 and 5) relative to the circuit substrate 214 to which the lens 106 can be more readily attached, which is more proximate to the area that the lens 106 attaches to the housing 102.

FIG. 4 illustrates a partial cross-sectional side view 400 of the circuit substrate 214 and end cap 216. The raised surface 432 of the end cap 216 extends at least partially into the space between the circuit substrate and the front edge of the housing. Such an extension can include a direction that is one or both of parallel 434 and perpendicular 436 to a front surface of the circuit substrate 214 and correspondingly the raised surface 432 of the end cap 216. In at least some instances, the raised surface 432 of the end cap 216 is substantially in line with the front edge 538 of the housing 102, as shown in FIG. 5. In this way, the lens 106 can be more readily adhered to the raised surface 432 of the end cap 216 in addition to the front edge 538 of the housing 102. This in turn creates a larger area of adhesion, which can potentially withstand greater levels of external force applied to the device without the lens 106 becoming delaminated.

FIG. 5 illustrates a partial side cross-sectional view 500 of a device including an assembly for attaching the lens 106 to the housing 102. In addition to more clearly showing the attachment of the lens 106 to the raised surface 432 of the end cap 216 and the front edge 538 of the housing 102, FIG. 5 further helps illustrate how a fastener, such as a screw, could be used to assist in the coupling of the end cap 216 to the circuit substrate 214.

FIGS. 6 and 7, similar to FIG. 5 illustrates respective partial side cross-sectional views 600 and 700 of a device including an assembly for attaching the lens 106 to the housing 102, which each represent an alternative embodiment to the assembly illustrated in FIG. 5. In each of FIG. 6 and FIG. 7 the same fastener used to attach the circuit substrate to the housing is similarly used to attach the end cap 216 to the circuit substrate 214. In FIG. 6, the end cap 216 continues to wrap around the circuit substrate 214, so as to include a portion both above and below the circuit substrate 214. Alternatively, in FIG. 7, the end cap 216 resides above the circuit substrate 214, but not below the circuit substrate 214. As such, the circuit substrate is allowed to interact more directly with the corresponding boss 222 of the housing 102.

By providing an area of attachment for the lens 106 that is in addition to the front edge 538 of the housing 102, a potentially stronger bond, which is more resistant to externally applied forces can be provided.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An assembly for attaching a lens to a housing of a device, said assembly comprising:
   a housing including a front opening, and a front edge which extends at least partially around the front opening;
   a circuit substrate coupled to the housing;
   one or more end caps coupled to the circuit substrate, the one or more end caps each having a front facing surface, where each end cap extends at least partially into the space between the circuit substrate and the front edge of the housing; and
   a lens adhered to both the housing and the front facing surface of the one or more end caps.

2. An assembly in accordance with claim 1, wherein the housing includes a back side opposite the front opening and one or more sidewalls that extend from the back side to the front edge, which extends at least partially around the front opening.

3. An assembly in accordance with claim 2, wherein the front opening is sized to receive the circuit substrate into the housing via the front opening.

4. An assembly as recited in claim 2, wherein the sidewalls of the housing are integrated with the back side of the housing to form a bucket configuration for the housing.

5. An assembly as recited in claim 1, wherein the circuit substrate is a printed circuit board.

6. An assembly in accordance with claim 1, wherein the circuit substrate is recessed from the front opening in a direction placing the circuit substrate within the housing.

7. An assembly in accordance with claim 1, wherein the one or more end caps overlap the circuit substrate.

8. An assembly in accordance with claim 7, wherein the circuit substrate has a front surface and a back surface opposite the front surface, wherein the front surface faces toward the front of the device, and wherein the one or more end caps overlap at least partially the front surface of the circuit substrate.

9. An assembly in accordance with claim 8, wherein in addition to overlapping at least partially the front surface of the circuit substrate, each of the one or more end caps overlaps at least partially the back surface of the circuit substrate.

10. An assembly in accordance with claim 1, wherein the one or more end caps each have a slot, the slot having a width corresponding to the thickness of the circuit substrate for receiving an end of the circuit substrate.

11. An assembly in accordance with claim 10, wherein at least one of the one or more end caps includes one or more voids adapted to coincide with the placement of components on the circuit substrate proximate the end of the circuit substrate to be received in the slot of the at least one end cap.

12. An assembly in accordance with claim 1, wherein each of the one or more end caps extending at least partially into the space between the circuit substrate and the front edge of the housing extends in a direction parallel to the front facing surface of the end cap.

13. An assembly in accordance with claim 1, wherein each of the one or more end caps extending at least partially into the space between the circuit substrate and the front edge of the housing extends in a direction perpendicular to the front facing surface of the end cap.

14. An assembly in accordance with claim 1, wherein the front facing surface of each of the one or more end caps is substantially in line with the front edge of the housing which extends at least partially around the front opening.

15. An assembly in accordance with claim 1, wherein the one or more end caps includes a pair of end caps, where each one of the pair of end caps is coupled to the circuit substrate at opposite ends of the circuit substrate.

16. An assembly in accordance with claim 1, wherein the assembly further comprises a display positioned between the circuit substrate and the lens.

17. An assembly in accordance with claim 1, wherein the one or more end caps are formed from a rigid substance adapted for providing additional structural support for at least one of the circuit substrate and the housing.

18. An assembly in accordance with claim 1, wherein the assembly is for use in a hand-held electronic device.

19. An assembly in accordance with claim 18, wherein the hand-held electronic device is a wireless communication device.

20. A hand-held electronic device comprising:
- a housing including a front opening, and a front edge which extends at least partially around the front opening;
- a circuit substrate coupled to the housing;
- one or more end caps coupled to the circuit substrate, the one or more end caps each having a front facing surface that is substantially parallel and in line with the front edge of the housing, each of the one or more end caps extending at least partially into the space between the circuit substrate and the front edge of the housing; and
- a lens coupled to the housing at the front edge and the front facing surface of the one or more end caps.

* * * * *